United States Patent
Gagnier et al.

(10) Patent No.: US 9,956,897 B2
(45) Date of Patent: May 1, 2018

(54) SEAT BOLSTER TRIM HAVING FLEXIBLE INTERIOR FACING FOR AN OPTIMAL BOLSTER CUSHION

(71) Applicant: Ford Global Technologies, LLC, Dearborn, MI (US)

(72) Inventors: Todd Gagnier, Garden City, MI (US); S. M. Akbar Berry, Windsor (CA); Marcos Silva Kondrad, Macomb Township, MI (US); Johnathan Andrew Line, Northville, MI (US); Brian Boland, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 15/206,648

(22) Filed: Jul. 11, 2016

(65) Prior Publication Data
US 2018/0009344 A1   Jan. 11, 2018

(51) Int. Cl.
*A47C 3/00* (2006.01)
*B60N 2/58* (2006.01)

(52) U.S. Cl.
CPC ............. *B60N 2/58* (2013.01); *B60N 2/914* (2018.02); *B60N 2/99* (2018.02)

(58) Field of Classification Search
CPC ... B60N 2/62; B60N 2/02; B60N 2/66; B60N 2/4492
USPC ........ 297/284.9, 284.11, 312, 452.25, 284.1, 297/284.6
See application file for complete search history.

(56) References Cited

U.S. PATENT DOCUMENTS

| | | | | |
|---|---|---|---|---|
| 6,129,419 | A * | 10/2000 | Neale .................. | B60N 2/4415 297/284.4 |
| 7,322,651 | B2 | 1/2008 | Makhsous et al. | |
| 8,408,646 | B2 * | 4/2013 | Harper .................. | B60N 2/02 297/284.11 |
| 8,844,966 | B2 * | 9/2014 | Feller .................. | B60N 2/4492 280/728.2 |
| 2005/0179306 | A1 | 8/2005 | White et al. | |
| 2008/0231099 | A1 * | 9/2008 | Szczepkowski ....... | A47C 7/022 297/284.11 |
| 2009/0174242 | A1 * | 7/2009 | Kohl .................. | B60N 2/0284 297/284.11 |
| 2014/0361571 | A1 * | 12/2014 | Line .................. | B60N 2/449 296/65.01 |
| 2015/0197173 | A1 * | 7/2015 | Hulway .............. | B60N 2/643 297/284.9 |

* cited by examiner

*Primary Examiner* — Chi Q Nguyen
(74) *Attorney, Agent, or Firm* — Vichit Chea; Price Heneveld LLP

(57) ABSTRACT

A vehicle seat includes a seat base having a side bolster cover. A bolster is disposed under the side bolster cover. The bolster has a static bolster carrier and an operable portion that is operable relative to the bolster carrier to define a plurality of bolster positions. A flexible interior facing extends from the bolster carrier to an intermediate portion of the bolster cover, wherein a lower edge of the bolster cover is positioned below the bolster carrier such that the bolster cover conceals the bolster in each of the plurality of bolster positions.

20 Claims, 6 Drawing Sheets

SEAT BOLSTER TRIM HAVING FLEXIBLE INTERIOR FACING FOR AN OPTIMAL BOLSTER CUSHION

FIELD OF THE INVENTION

The present invention generally relates to vehicle seating, and more specifically, a vehicle seat having an operable bolster and a trim for concealing the operable bolster.

BACKGROUND OF THE INVENTION

Various automobiles include vehicle seats with operable cushions that can be manipulated to serve the needs of the user. One operable portion is a bolster of the base of the vehicle seat that could be moved upward and downward to at least partially surround the occupant of the vehicle seat.

SUMMARY OF THE INVENTION

According to one aspect of the present invention, a vehicle seat includes a seat base having a side bolster cover. A bolster is disposed under the side bolster cover. The bolster has a static bolster carrier and an operable portion that is operable relative to the bolster carrier to define a plurality of bolster positions. A flexible interior facing extends from the bolster carrier to an intermediate portion of the bolster cover, wherein a lower edge of the bolster cover is positioned below the bolster carrier such that the bolster cover conceals the bolster in each of the plurality of bolster positions.

According to another aspect of the present invention, a vehicle includes a base for a vehicle seat and a bolster disposed under a bolster cover of the base. The bolster includes a static lower plate and an operable portion that defines a plurality of bolster positions. An elastic interior facing extends between the lower plate to an intermediate portion of the bolster cover. The bolster cover includes a lower edge distal from the facing and the bolster that extends below the bolster and conceals the bolster in each of the plurality of bolster positions.

According to another aspect of the present invention, a vehicle seat includes a base having a bolster cover and a bolster having a cushion carrier and an upper plate operable between a plurality of positions. An interior facing extends from the cushion carrier to an inside portion of the bolster cover. A lower edge of the bolster cover is free of engagement with the bolster and is positioned below the cushion carrier in each of the plurality of positions.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
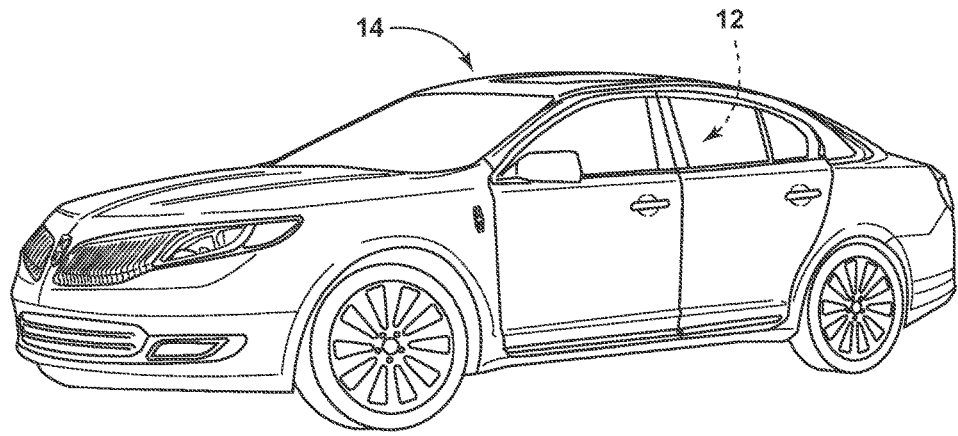
FIG. 1 is a side perspective view of a vehicle having a vehicle seat that incorporates an aspect of the bolster trim having flexible interior facing.
Figure 2:
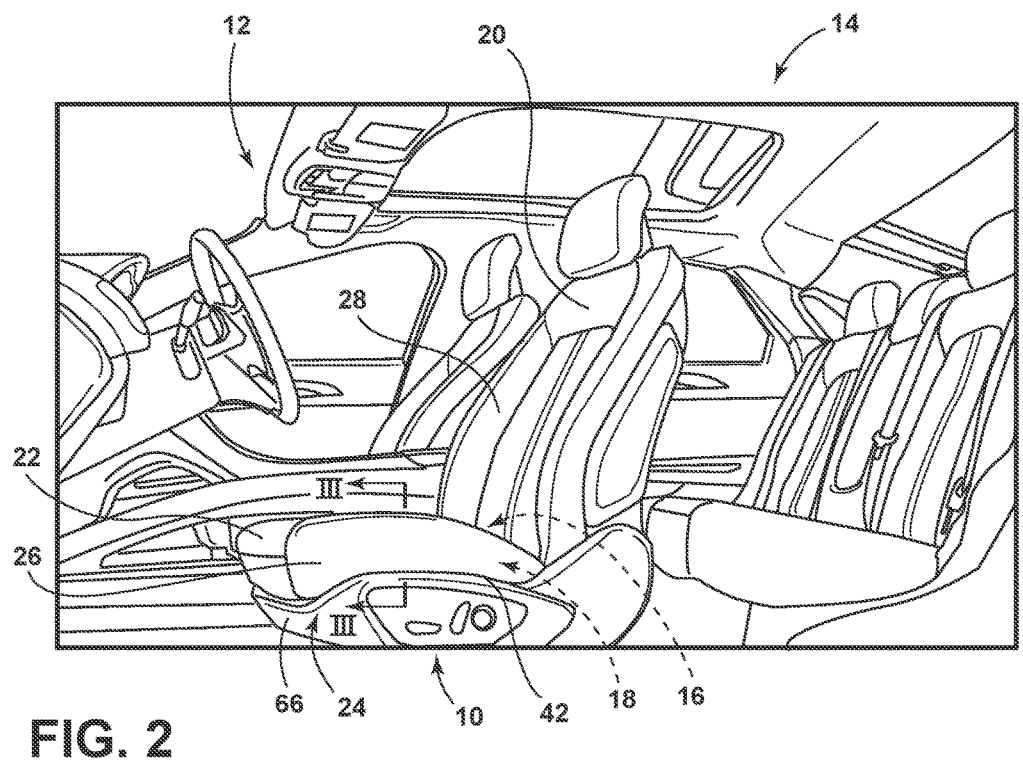
FIG. 2 is a perspective view of a passenger cabin of a vehicle of FIG. 1.
Figure 3:
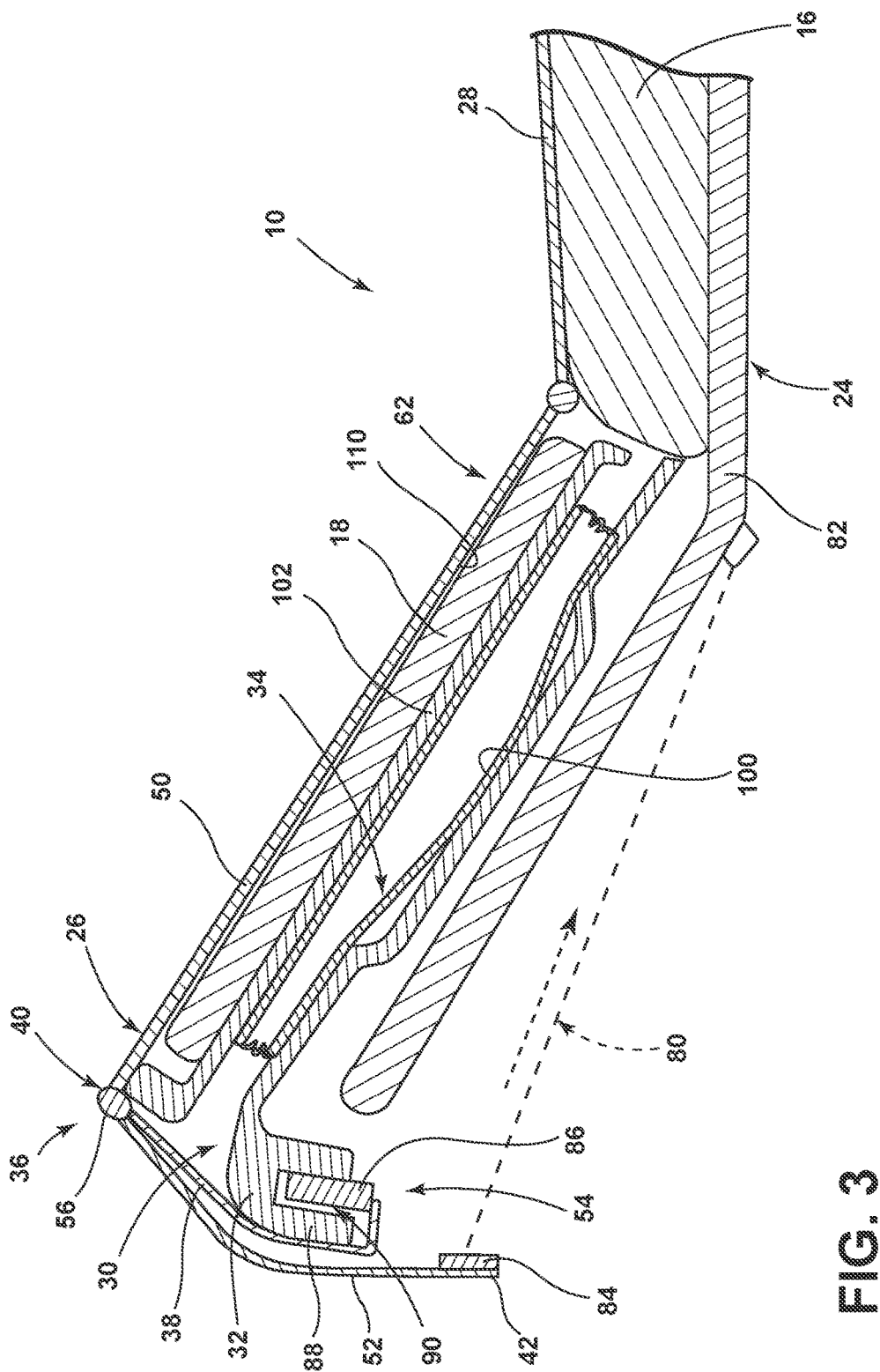
FIG. 3 is a cross-sectional view of the vehicle seat of FIG. 2, taken along line with the bolster in a deflated state.
Figure 4:
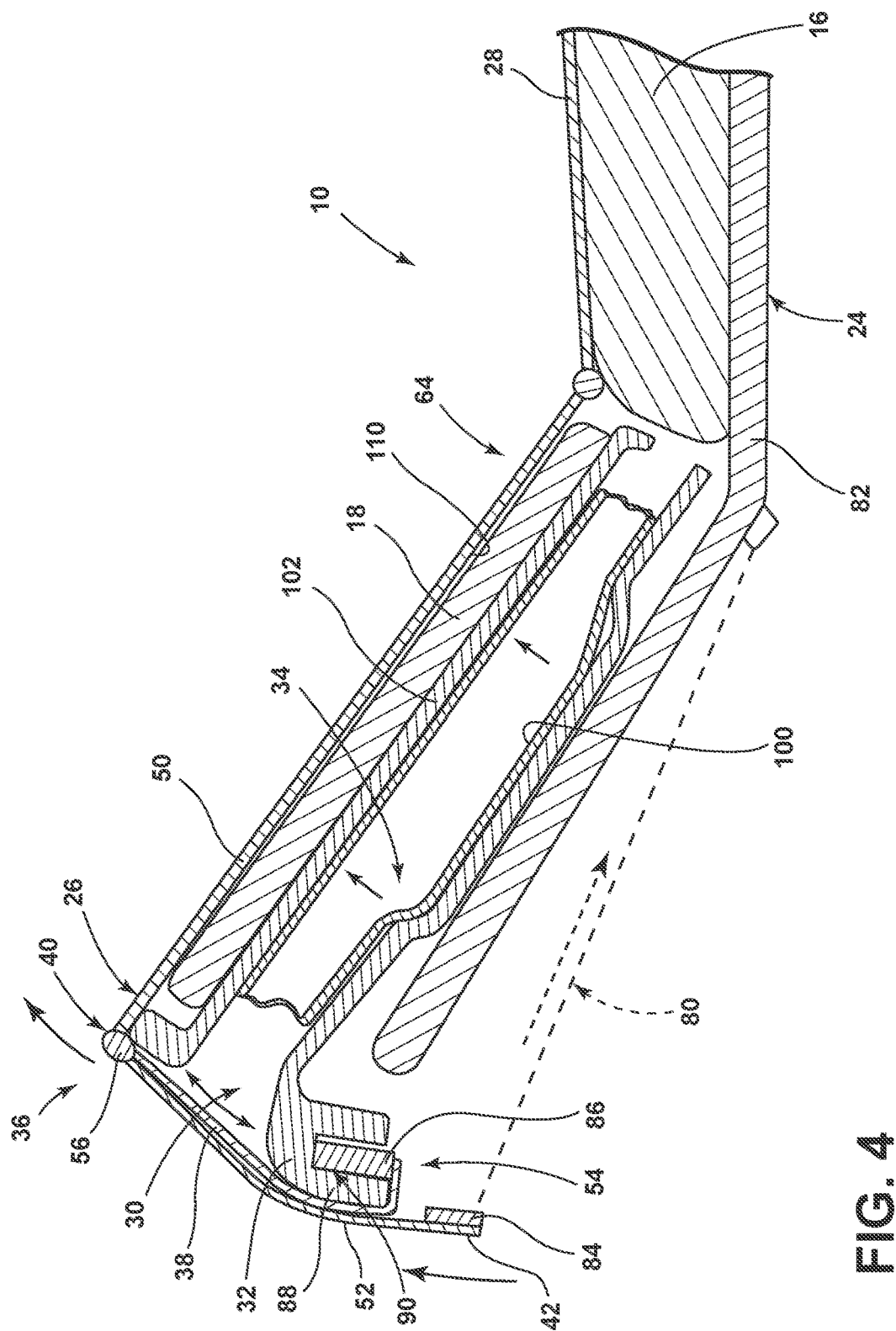
FIG. 4 is a cross-sectional view of the vehicle seat of FIG. 3 with the bolster in a partially inflated stated.
Figure 5:
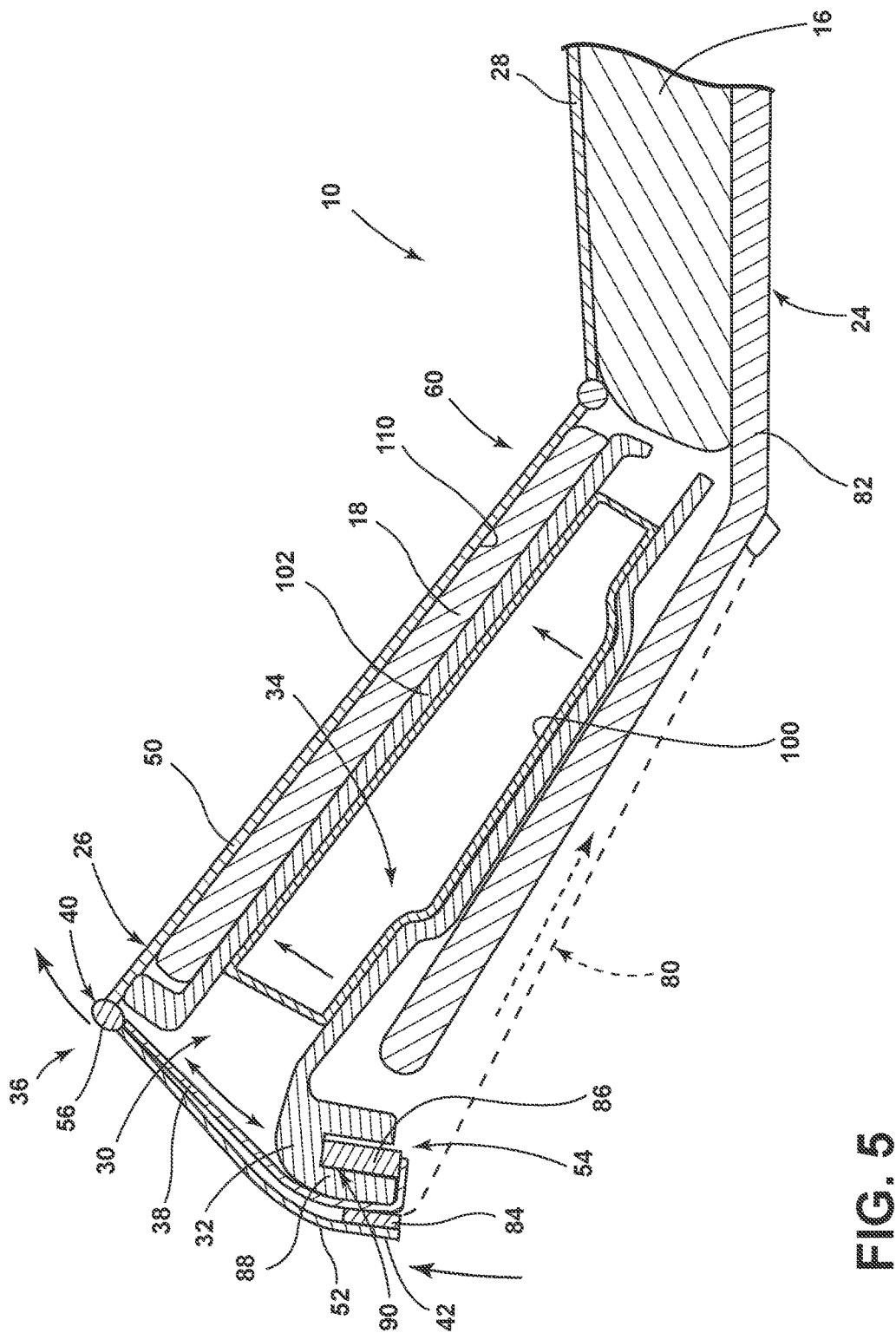
FIG. 5 is a cross-sectional view of the vehicle seat of FIG. 3 with the bolster in an inflated state.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-5, reference numeral 10 generally refers to a vehicle seat disposed within a passenger compartment 12 of a vehicle 14 and incorporating various seating surfaces including a base cushion 16, a bolster cushion 18, a seat back 20, at least one thigh extension 22, and other similar cushions. According to the various embodiments, the vehicle seat 10 can include a seat base 24 having a side bolster cover 26, where the side bolster cover 26 is at least partially integrated with the remainder of the seating cover 28 for defining the various seating surfaces of the vehicle seat 10. A bolster 30, such as an operable bolster, is disposed under the side bolster cover 26. The bolster 30 includes a static bolster carrier 32 and an operable portion 34 that is operable relative to the bolster carrier 32 to define a plurality of bolster 30 positions. A flexible interior facing 38 extends from the bolster carrier 32 to an intermediate portion 40 of the bolster cover 26 and is at least partially covered by the bolster cover 26. A lower edge 42 of the bolster cover 26 is positioned below the bolster carrier 32 such the bolster cover 26 conceals the bolster 30 in each of the plurality of bolster positions 36. It is contemplated that as the bolster 30 is operated between the plurality of the bolster positions 36, the flexible interior facing 38 stretches with the movement of the bolster 30 such that the lower edge 42 of the bolster cover 26 does not experience significant deflection, or does not experience any deflection of operation of the bolster 30.

Referring again to FIGS. 1-9, it is contemplated that the side bolster cover 26 can include a lateral portion 50 and a vertical portion 52 that cooperate to define a bolster interior 54, where the bolster 30 is disposed within the bolster interior 54. Additionally, in such an embodiment, the flexible interior facing 38 engages the side bolster cover 26 at the seam 56 defined between the lateral and vertical portions 50, 52 of the side bolster cover 26. Further, operation of the operable portion 34 of the bolster 30 between the plurality of bolster positions 36 defines a primary deflection of the side bolster cover 26 within the lateral portion 50. As discussed above, the primary deflection in the vertical direction is experienced almost entirely, or entirely, by the vertically oriented flexible interior facing 38 that extends from the seam 56 and down to the bolster carrier 32. In this manner, the corresponding deflection of the vertical portion 52 of the bolster cover 26, during operation of the operable portion 34 is limited or can be nonexistent such that the lower edge 42 of the bolster cover 26 maintains its shape and, depending upon the configuration of the bolster cover 26, may remain entirely below the flexible interior facing 38.

According to various embodiments, it is contemplated that during operation of the bolster 30, portions of the flexible interior facing 38 may be visible under the lower edge 42 of the bolster cover 26 when the bolster 30 is moved to an inflated state 60. In such an embodiment, the lower edge 42 of the bolster cover 26 maintains its shape and does not deflect significantly during operation of the bolster 30 from a deflated state 62 through a partially inflated state 64 and to the inflated state 60. Portions of the flexible interior facing 38 may be visible under the lower edge 42 of the bolster cover 26. However, it is contemplated that such portions may be the same color, or near the same color, as the side bolster covers 26 and/or the lower portion 66 of the seat base 24 of the vehicle seat 10 such that the flexible interior facing 38 would not be readily discernable from the surrounding portions of the vehicle seat 10.

Referring to FIGS. 1-5, the side bolster cover 26 can include at least one retaining strap 80 that extends from proximate the lower edge 42 of the bolster cover 26 to a portion of the bolster carrier 32 or a frame 82 of the seat base 24. The retaining straps 80 can be made of an elastic material to maintain a tension through the one or more retaining straps 80. This configuration serves to retain the lower edge 42 of the bolster cover 26 at a lowest possible position relative to static bolster carrier 32. The side bolster cover 26 can include one or more retaining straps 80 that extend from the lower side bolster cover 26 to a portion of the static bolster carrier 32. As the bolster 30 moves to the inflated state 60, the lower edge 42 of the bolster cover 26 is translated upward. The retaining straps 80 bias the lower edge 42 downward to maintain the concealing properties of the bolster cover 26. This serves to at least partially conceal the bolster 30 and the interior facing 38 during operation of the bolster 30. It is also contemplated that the lower edge 42 of the side bolster cover 26 can include a rigid support 84 that extends between or around the retaining straps 80. The rigid support 84 serves to maintain a spacing of the retaining straps 80 and also serves to prevent rippling of the lower edge 42 of the side bolster cover 26 during operation of the bolster 30 between the plurality of bolster positions 36. Similarly, the flexible interior facing 38 can also include a rigid edge member 86 that fixedly engages the static bolster carrier 32. The outer portion 88 of the static bolster carrier 32 can include a facing receptacle 90, such as a slot defined within the outer portion 88 of the bolster carrier 32, that receives the rigid edge member 86 of the flexible interior facing 38. It is contemplated that other types of engagement between the flexible interior facing 38 and the bolster carrier 32 can also be implemented. Such engagements can include an arrow-type engagement, various protrusions, a sliding engagement, other similar interference-type engagements, adhesives, fasteners, combinations thereof, and other similar connection mechanisms that can secure the flexible interior facing 38 to the bolster carrier 32.

Referring again to FIGS. 3-5, it is contemplated that the operable portion 34 of the bolster 30 can include an inflatable bladder 100 that inflates and deflates to define the plurality of bolster positions 36. It is also contemplated that operable portion 34 of the bolster 30 can include a rotationally operable upper plate 102 that rotates relative to the static bolster carrier 32 to define the plurality of bolster positions 36. It is contemplated that the upper plate 102 of the bolster 30 can be operated through an inflatable bladder 100 disposed between the upper plate 102 and the static bolster carrier 32. It is also contemplated that motors, actuators, pneumatic mechanisms, hydraulic mechanisms, combinations thereof, and other similar mechanisms can also be used to operate the upper plate 102 relative to static bolster carrier 32.

Referring again to FIGS. 3-5, the interior facing 38 can be an elastic member that extends between a lower plate of the bolster 30, which corresponds to the static bolster carrier 32 to an intermediate portion 40 of the bolster cover 26. It is contemplated that the elastic interior facing 38 can be made of spandex, rubber, various elastic polymers, combinations thereof, and other similar elastic materials. As discussed above, the bolster cover 26 can include a lower edge 42 that is distal from the interior facing 38. The lower edge 42 of the bolster 30 extends at least partially below the bolster 30 and conceals at least the operable portion 34 of the bolster 30 in each of the plurality of bolster positions 36.

Referring again to FIGS. 3-5, during operations of the bolster 30, the inflatable bladder 100 serves to rotationally operate the upper plate 102 relative to the static bolster carrier 32. In this manner, the upper plate 102 is rotated away from the static bolster carrier 32 thereby extending the space between the two. As the top plate moves upward, the portion of the side bolster cover 26 also moves upward due to the increasing height of the top plate of the bolster 30 relative to the bolster carrier 32. However, the top plate of the bolster 30, as it rotates, does not engage the vertical portion 52 of the bolster cover 26. Rather, the top portion of the bolster 30 engages the flexible interior facing 38. The flexible interior facing 38 stretches to accommodate the movement of the top plate relative to the static bolster carrier 32 such that the vertical portion 52 of the bolster cover 26 conceals the top plate and a substantial portion of the elastic interior facing 38. As discussed above, the vertical portion 52 of the side bolster 30 does not experience vertical substantial deflection. Rather, the vertical portion 52 is translated upward and is permitted to extend downward from the seam 56 where the vertical portion 52 engages the lateral portion 50 of the bolster cover 26. The lateral portion 50 of the bolster cover 26 is deflected upward with the movement of the top plate where the lateral portion 50 of the bolster cover 26 engages both the top plate and the occupant of the vehicle seat 10. The vehicle 14 portion of the bolster cover 26 extends downward from the seam 56 and performs a primary concealing function to hide the various operable parts of the bolster 30 of the vehicle seat 10.

Referring again to FIGS. 3-5, when the bolster 30 moves from one of the inflated positions back to the deflated position, the top plate of the bolster 30 moves downward and closer to the static bolster carrier 32 of the bolster 30. As this rotation of the top plate occurs, the flexible interior facing 38 is placed under less tension and is returned to its original shape in the deflated state 62 of the bolster 30. Additionally, as the top plate is moved back to the deflated position of the bolster 30, the vertical portion 52 of the bolster cover 26 moves downward along with movement of the seam 56, from which the vertical portion 52 of the bolster cover 26 extends. Minimal tension may be experienced by the vertical portion 52 of the bolster cover 26, but this vertical tension is typically only exerted by the one or more flexible retaining straps 80 that extend from the lower edge 42 of the side bolster 30 to a portion of the static bolster carrier 32. The inclusion of these retaining straps 80 helps to ensure that the vertical portion 52 of the bolster cover 26 returns to the deflated state 62 with the top plate of the bolster 30, on the lateral portion 50 of the bolster cover 26 and the flexible interior facing 38.

Referring again to FIGS. 1-5, the vehicle seat 10 can include the seat base 24 that includes the bolster cover 26. The bolster 30 can include a static bolster carrier 32 that can also operate as a cushion carrier. The bolster 30 also includes an upper plate 102 that is operable between the plurality of the bolster positions 36. The interior facing 38 extends from the cushion carrier, or the static bolster carrier 32, to an inside portion 110 of the bolster cover 26, such as an intermediate portion 40. A lower edge 42 of the bolster cover 26 is free of engagement with the bolster 30 and conceals the cushion carrier, or static bolster carrier 32, in each of the plurality of bolster positions 36. It is contemplated that the vertical portion 52 of the bolster cover 26 can be configured to have a height such that the vertical portion 52 of the bolster cover 26 fully conceals both the interior facing 38 and the bolster 30 in each of the plurality of bolster positions 36.

Figure 6:
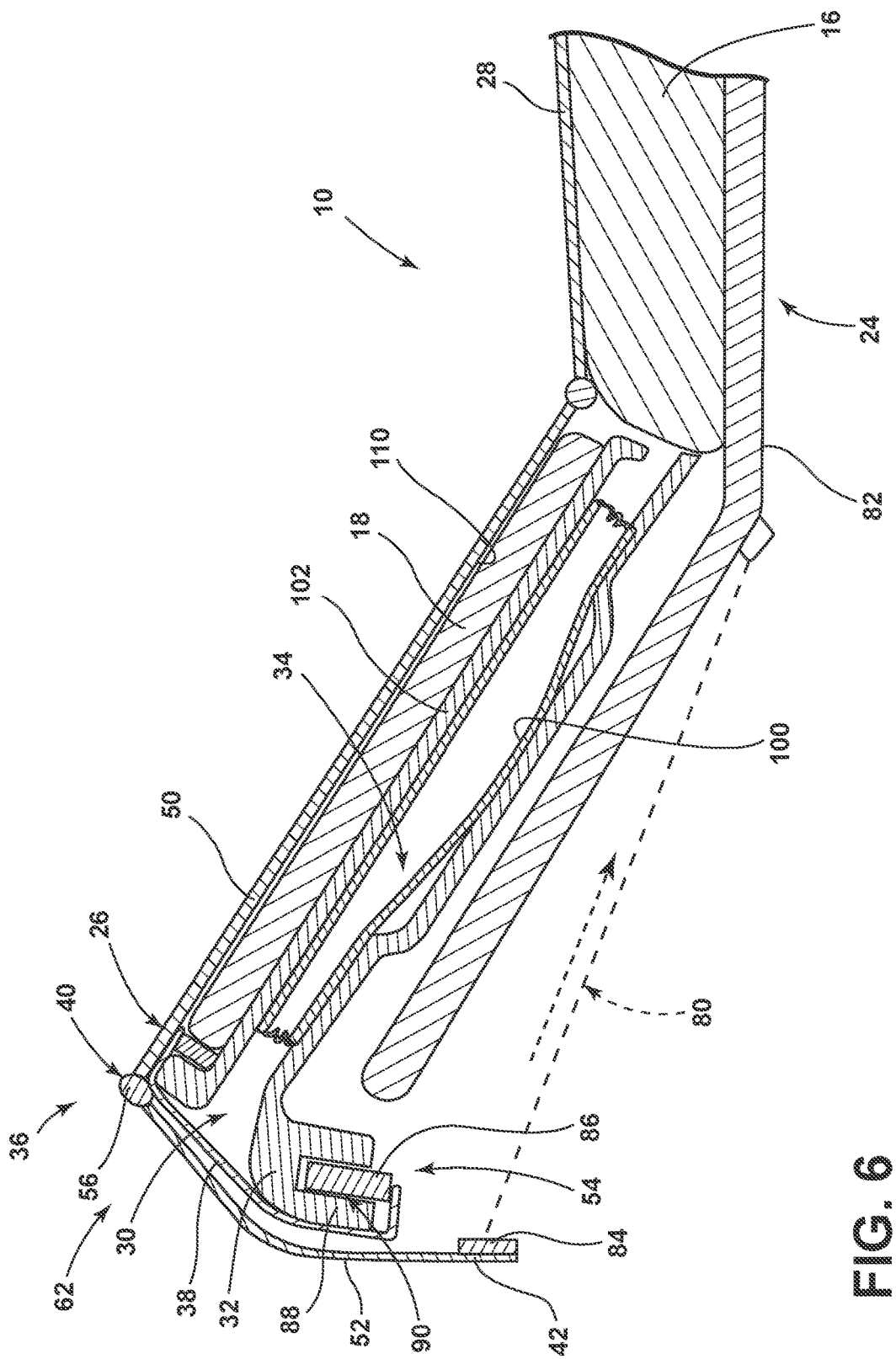
FIG. 6 is an alternate aspect of the bolster for a vehicle seat with the bolster in a deflated state.
Figure 7:
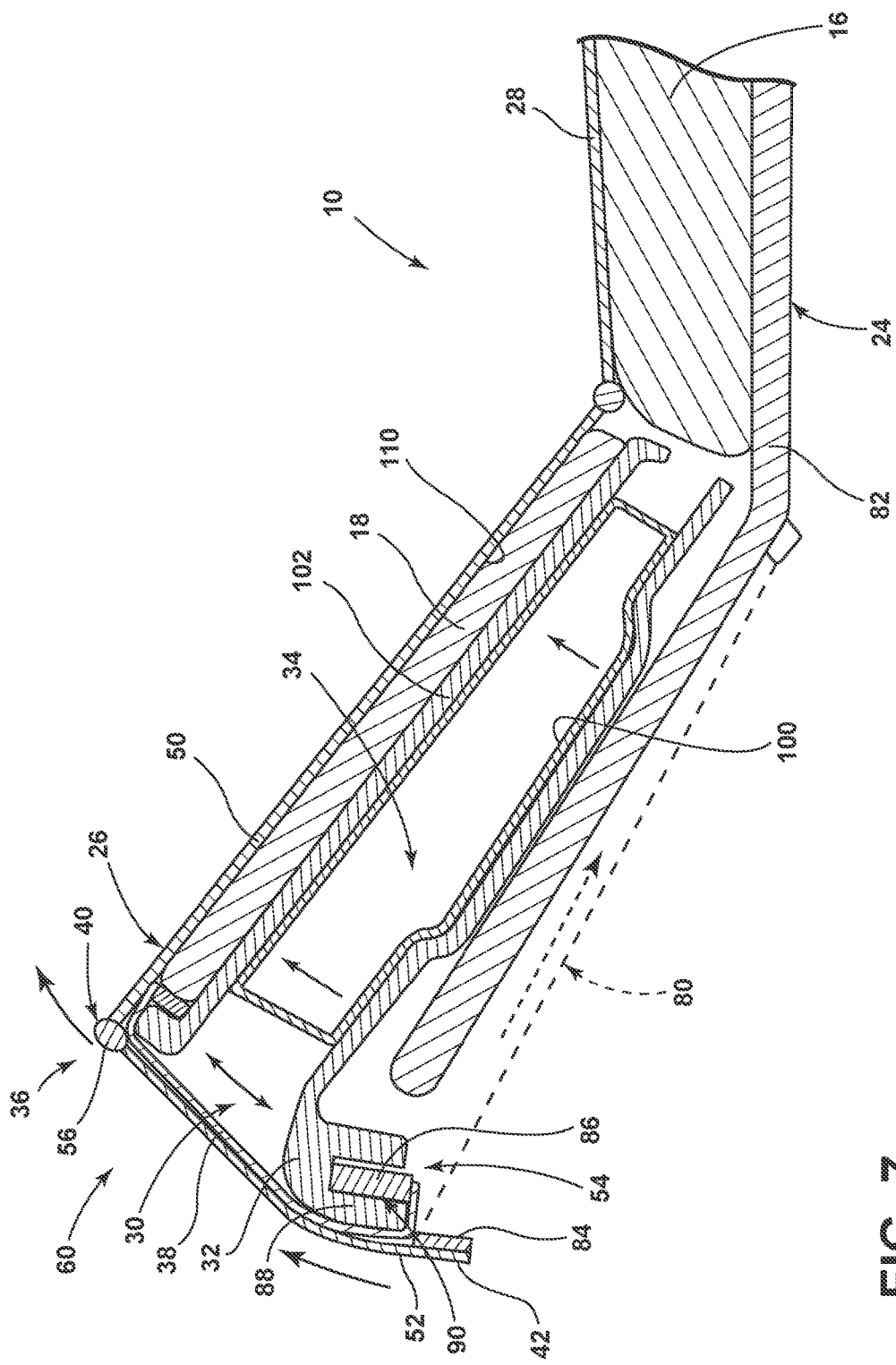
FIG. 7 is a cross-sectional view of the vehicle seat of FIG. 6 with the bolster in an inflated state.

According to the various embodiments, as exemplified in FIGS. 6 and 7, it is contemplated that the flexible interior facing 38 can extend from the static bolster carrier 32 to an intermediate portion 40 of the bolster cover 26 that is distal from this seam 56 between the vertical portion 52 and the lateral portion 50 of the bolster cover 26. The flexible interior facing 38 can also attach proximate the operable upper plate 102. According to various embodiments, it is contemplated that flexible interior facing 38 can extend over a portion of the top plate and connect proximate a portion of the bolster cover 26 between the seam 56 and the primary seating surface of the vehicle seat 10. In this manner, as the top plate rotates to define the plurality of bolster positions 36, the top plate slidably engages the flexible interior facing 38 and causes a stretching of the flexible interior facing 38 as the top plate operates. The stretching of the flexible interior facing 38 is typically transferred to the lateral portion 50 of the bolster cover 26, but not to the vertical portion 52 of the bolster cover 26 which can maintain its shape along the lower edge 42 of the bolster cover 26 during operations of the top plate. To assist in maintaining the configuration of the lower edge 42 of the bolster cover 26, the retaining straps 80, which can typically be made of elastic, serve to maintain the lower edge 42 of the vertical portion 52 of the bolster cover 26 at its lowest possible position during operation of the bolster 30.

According to the various embodiments, it is contemplated that the bolster cover 26 can be made of any one of various materials that could include, but is not limited to, leather, cloth, various polymers, vinyl, combinations thereof, and other similar material typically seen in vehicle seating applications. It is contemplated that the flexible interior facing 38 can be incorporated in any one of various seating positions within the vehicle 14 that include an operable bolster 30. Such seating positions can include, but are not limited to, front row seating, seating positions within rear portions of the passenger cabin, and any other seating that includes an operable bolster 30.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat comprising:
    a seat base having a side bolster cover;
    a bolster disposed under the side bolster cover, the bolster having a static bolster carrier and an operable portion that is operable relative to the bolster carrier to define a plurality of bolster positions; and
    a flexible interior facing extending from the static bolster carrier to an intermediate portion of the side bolster cover, wherein a lower edge of the side bolster cover is positioned below the static bolster carrier such that the side bolster cover conceals the bolster in each of the plurality of bolster positions.

2. The vehicle seat of claim 1, wherein the side bolster cover includes retaining straps that extend from the lower edge of the side bolster cover to a portion of a frame of the seat base.

3. The vehicle seat of claim 1, wherein the operable portion of the bolster includes a rotationally operable upper plate that rotates relative to the static bolster carrier to define the plurality of bolster positions.

4. The vehicle seat of claim 1, wherein the operable portion includes an inflatable bladder.

5. The vehicle seat of claim 1, wherein the flexible interior facing is spandex.

6. The vehicle seat of claim 1, wherein the side bolster cover includes a lateral portion and a vertical portion that cooperate to define a bolster interior, wherein the bolster is disposed in the bolster interior.

7. The vehicle seat of claim 6, wherein the flexible interior facing engages the side bolster cover at a seam defined between the lateral and vertical portions of the side bolster cover.

8. The vehicle seat of claim 7, wherein operation of the operable portion of the bolster between the plurality of bolster positions defines a primary deflection of the side bolster cover within the lateral portion, and wherein corresponding deflection of the vertical portion during operation of the operable portion is limited such that the lower edge of the side bolster cover remains below the flexible interior facing.

9. The vehicle seat of claim 1, wherein the flexible interior facing includes a rigid edge member that fixedly engages the static bolster carrier.

10. A vehicle comprising:
    a base for a vehicle seat;
    a bolster disposed under a bolster cover of the base, the bolster including a static lower plate and an operable portion that defines a plurality of bolster positions; and
    an elastic interior facing extending between the lower plate to an intermediate portion of the bolster cover, wherein the bolster cover includes a lower edge distal from the facing and the bolster that extends below the bolster and conceals the bolster in each of the plurality of bolster positions.

11. The vehicle of claim 10, wherein the elastic interior facing includes a rigid edge member that engages a slot within an outer portion of the static lower plate.

12. The vehicle of claim 11, wherein the bolster cover includes a lateral portion and a vertical portion that cooperate to define a bolster interior, wherein the bolster is disposed in the bolster interior, wherein the interior facing opposite the rigid edge member engages the bolster cover at a seam defined between the lateral and vertical portions, and wherein movement of the operable portion of the bolster to define any of the plurality of bolster positions defines a primary deflection of the bolster cover within the lateral portion, and wherein corresponding deflection of the vertical portion during operation of the operable portion of the bolster is limited such that the lower edge of the bolster cover remains below the interior facing.

13. A vehicle seat comprising:
a base having a bolster cover;
a bolster having a cushion carrier and an upper plate operable between a plurality of positions; and
an interior facing extending from the cushion carrier to an inside portion of the bolster cover, a lower edge of the bolster cover being free of engagement with the bolster and positioned below the cushion carrier in each of the plurality of positions.

14. The vehicle seat of claim 13, wherein the interior facing is spandex.

15. The vehicle seat of claim 13, wherein the bolster and the interior facing are concealed by the bolster cover in each of the plurality of positions.

16. The vehicle seat of claim 13, wherein the bolster cover includes at least one securing strap that extends from the bolster proximate the lower edge to a portion of a frame of the base.

17. The vehicle seat of claim 13, wherein the bolster cover includes a lateral portion and a vertical portion that cooperate to define a bolster interior, wherein the bolster is disposed in the bolster interior.

18. The vehicle seat of claim 17, wherein the interior facing engages the bolster cover at a seam defined between the lateral and vertical portions.

19. The vehicle seat of claim 17, wherein operation of the upper plate between the plurality of bolster positions defines a primary deflection of the bolster cover within the lateral portion, and wherein corresponding deflection of the vertical portion during operation of the upper plate is limited such that the lower edge of the bolster cover remains below the interior facing.

20. The vehicle seat of claim 13, wherein the bolster includes an inflatable bladder positioned between the cushion carrier and the upper plate, the inflatable bladder operable to manipulate the upper plate to define the plurality of positions of the bolster.

* * * * *